(12) United States Patent
Goto et al.

(10) Patent No.: US 8,857,857 B2
(45) Date of Patent: Oct. 14, 2014

(54) THREADED JOINT FOR STEEL PIPES

(75) Inventors: Kunio Goto, Kobe (JP); Shigeo Nagasaku, Nishinomiya (JP); Shigeo Onishi, Osaka (JP); Hiroaki Ikegami, Nishinomiya (JP)

(73) Assignees: Nippon Steel & Sumitomo Metal Corporation, Tokyo (JP); Vallourec Oil and Gas France, Aulnoye-Aymeries (FR)

( * ) Notice: Subject to any disclaimer, the term of this patent is extended or adjusted under 35 U.S.C. 154(b) by 0 days.

(21) Appl. No.: 12/381,649

(22) Filed: Mar. 13, 2009

(65) Prior Publication Data

US 2009/0236850 A1 Sep. 24, 2009

Related U.S. Application Data

(63) Continuation of application No. PCT/JP2007/068475, filed on Sep. 13, 2007.

(30) Foreign Application Priority Data

Sep. 14, 2006 (JP) ................................. 2006-249643

(51) Int. Cl.
| | |
|---|---|
| *F16L 15/00* | (2006.01) |
| *C10M 169/04* | (2006.01) |
| *F16L 58/18* | (2006.01) |
| *C23C 28/02* | (2006.01) |
| *C23C 28/00* | (2006.01) |
| *E21B 17/042* | (2006.01) |

(52) U.S. Cl.
CPC ..... *C10M 169/041* (2013.01); *C10M 2205/183* (2013.01); *C10M 2215/006* (2013.01); *C10M 2201/0663* (2013.01); *C10N 2240/408* (2013.01); *C10M 2209/006* (2013.01); *C10M 2201/0653* (2013.01); *F16L 58/182* (2013.01); *E21B 17/042* (2013.01); *C23C 28/021* (2013.01); *C23C 28/023* (2013.01); *C10N 2230/06* (2013.01); *C10N 2230/12* (2013.01); *F16L 15/001* (2013.01); *C10M 2201/1033* (2013.01); *C23C 28/00* (2013.01); *C10N 2250/141* (2013.01)
USPC ............................................. 285/94; 285/333

(58) Field of Classification Search
USPC ............................... 285/55, 94, 333, 334, 390
See application file for complete search history.

(56) References Cited

U.S. PATENT DOCUMENTS

| | | | | |
|---|---|---|---|---|
| 4,468,309 A | * | 8/1984 | White ........................... | 427/528 |
| 4,474,651 A | * | 10/1984 | Yauchi et al. .................. | 285/329 |

(Continued)

FOREIGN PATENT DOCUMENTS

| | | |
|---|---|---|
| EP | 0 157 587 | 10/1985 |
| EP | 0 500 482 | 8/1992 |

(Continued)

OTHER PUBLICATIONS

Eiji Tsuru et al., "Dope-free ... Tubular Goods", Nippon Steel Tech. Reports No. 81,. Jan. 2000, pp. 69-73.

*Primary Examiner* — James Hewitt
(74) *Attorney, Agent, or Firm* — Clark & Brody

(57) ABSTRACT

A threaded joint for steel pipes having excellent galling resistance, rust preventing properties, and airtightness without using a compound grease comprises a pin and a box each having a threaded portion and an unthreaded metal-to-metal contact portion serving as contact surfaces. The contact surfaces of at least one of the pin and the box are coated with a multi-layered structure comprising, from the bottom, a first layer formed from a first metal or alloy, a second layer formed from a second metal or alloy which is softer than the first metal or alloy, and an uppermost layer of a solid lubricating coating comprising a lubricating powder in an organic or inorganic binder.

9 Claims, 2 Drawing Sheets

(56) References Cited

U.S. PATENT DOCUMENTS

| | | | |
|---|---|---|---|
| 4,506,432 A * | 3/1985 | Smith | 29/458 |
| 4,513,995 A * | 4/1985 | Niehaus et al. | 285/55 |
| 4,630,849 A * | 12/1986 | Fukui et al. | 285/55 |
| 4,871,194 A * | 10/1989 | Kawashima et al. | 285/55 |
| 4,893,658 A * | 1/1990 | Kimura et al. | 138/109 |
| 5,253,902 A * | 10/1993 | Petelot et al. | 285/94 |
| 5,678,608 A * | 10/1997 | Fontana | 138/96 T |
| 6,679,526 B2 * | 1/2004 | Yamamoto et al. | 285/55 |
| 6,746,057 B2 * | 6/2004 | Goto et al. | 285/333 |
| 6,971,681 B2 * | 12/2005 | Dell'Erba et al. | 285/55 |
| 7,472,927 B2 * | 1/2009 | Guise et al. | 285/55 |
| 2003/0094810 A1 * | 5/2003 | Goto et al. | 285/94 |
| 2004/0195825 A1 * | 10/2004 | Anraku et al. | 285/94 |
| 2006/0197343 A1 * | 9/2006 | Imai et al. | 285/333 |
| 2008/0217916 A1 * | 9/2008 | Nagasaku et al. | 285/334 |
| 2008/0277925 A1 * | 11/2008 | Goto et al. | 285/94 |
| 2010/0059986 A1 * | 3/2010 | Kimoto et al. | 285/55 |

FOREIGN PATENT DOCUMENTS

| | | |
|---|---|---|
| JP | 60-26695 | 2/1985 |
| JP | 5-71678 | 3/1993 |
| JP | 5-149486 | 6/1993 |
| JP | 8-105582 | 4/1996 |
| JP | 2001-65751 | 3/2001 |
| JP | 2001-99364 | 4/2001 |
| JP | 2002-327875 | 11/2002 |
| JP | 2003-42353 | 2/2003 |
| JP | 2003-74763 | 3/2003 |
| WO | 2006/075774 | 7/2006 |

* cited by examiner

THREADED JOINT FOR STEEL PIPES

This application is a continuation of International Patent Application No. PCT/JP2007/068475, filed Sep. 13, 2007.

TECHNICAL FIELD

This invention relates to a threaded joint for steel pipes and particularly a threaded joint for use in connecting oil country tubular goods to each other. More particularly, this invention is concerned with surface treatment of such a threaded joint.

A threaded joint for steel pipes according to the present invention can reliably exhibit excellent galling resistance without application of a compound grease which has been applied to threaded joints when they are used to connect oil country tubular goods and which contains a large amount of harmful heavy metal powder. Accordingly, a threaded joint for steel pipes according to the present invention can avoid the adverse effects on the global environment and the human body caused by the use of compound grease.

BACKGROUND ART

Oil country tubular goods (abbreviated as OCTG) are tubing and casing which are used to excavate oil wells for recovering crude oil or gas oil. They are normally connected to each other using threaded joints. In the past, the depth of oil wells was 2,000-3,000 meters, but in recent deep sea oil fields, it may reach 8,000-10,000 meters.

In its environment of use, a threaded joint for OCTG is subjected to a load in the form of an axial tensile force caused by the weight of OCTG and joints connected thereto, a combined internal and external pressure, and subterranean heat. Therefore, the threaded joint must maintain an airtight connection without breakage even in such a severe environment.

A typical threaded joint used for connecting OCTG has a pin-box structure comprising a male thread formed on the outer surface of each end portion (pin) of an oil country tubular good and a female thread formed on the inner surface (box) of a coupling (a threaded connecting member). An unthreaded metal-to-metal contact portion is formed on the front-end side of the male thread of the pin and on the inner side of the female thread of the box. By inserting one end of the oil country tubular good into the coupling and tightening the male thread and the female thread, the unthreaded metal-to-metal contact portions of the pin and the box are made to tightly contact each other to form a metal-to-metal seal, thereby achieving airtightness of the joint. Thus, each of the pin and box has a contact surface in its threaded portion and its unthreaded metal-to-metal contact portion.

During the operation of lowering tubing or casing into an oil well, due to various problems, there are cases in which a threaded joint which has once been tightened is loosened after tubing or casing being temporarily lifted out of the oil well, and then the joint is retightened before lowering the tubing or casing. API (the American Petroleum Institute) requires a threaded joint for OCTG to have sufficient galling resistance to make it possible to carry out tightening (makeup) and loosening (breakout) ten times for a joint for tubing and three times for a joint for casing without the occurrence of galling (unrepairable severe seizure) while maintaining airtightness.

When tightening a threaded joint, in order to increase its galling resistance and airtightness, a viscous liquid lubricant referred to as "compound grease" which contains a large amount of heavy metal powder is applied to the contact surfaces (namely, the threaded portions and the unthreaded metal-to-metal contact portions) of the joint. Such a compound grease is specified by API BUL 5A2. Compound grease also has the effect of preventing the surface from rusting.

For the purpose of increasing the retention of compound grease by a threaded joint and improving the sliding properties of the joint, it has been proposed that the contact surfaces of a threaded joint be subjected to surface treatment selected from nitride treatment, various types of plating such as zinc-based plating and dispersed plating, phosphate chemical conversion treatment, and the like to form one or more layers having increased surface roughness. However, the use of a compound grease has a concern of adverse effects on the environment and the human body, as described below.

Compound grease contains a large amount of powder of heavy metals such as lead, zinc, and copper in order to provide the grease with sufficient lubricity and corrosion resistance. When tightening a threaded joint having compound grease applied thereto, the applied grease is washed off or squeezed out to the exterior of the joint, and it may have an adverse effect on the environment and particularly on marine life due to its harmful heavy metal constituents such as lead. In addition, the process of applying compound grease worsens the working environment, and there is also a concern of harmful effects on the human body due to the harmful constituents.

Since the OSPAR Convention (Oslo-Paris Convention) pertaining to preventing maritime pollution in the Northeast Atlantic came into effect in 1998, strict environmental regulations have been increasing on a global scale, and in some regions, the use of compound grease is already being regulated. Accordingly, in order to avoid adverse effects on the environment and the human body in the excavation of gas wells and oil wells, a demand has developed for a threaded joint which can exhibit excellent galling resistance without application of a compound grease.

As a threaded joint which can be used for connecting OCTG without application of a compound grease, for example, Patent Document 1 cited below discloses a joint for steel pipes having at least three layers formed by surface treatment comprising a lowermost nitrided layer, an intermediate chemical conversion layer formed by manganese phosphating treatment, and an uppermost solid lubricating coating. Although the object is totally different from the present invention, Patent Document 2 cited below discloses a threaded joint for OCTG having a lower plated layer with a soft metal such as Cu, Zn, Sn, or Pb and an upper plated layer with a hard metal such as Cr, Mo, or W, while Patent Document 3 cited below discloses a threaded joint for OCTG having a lower coating layer of a material such as Ni having a melting point higher than the temperature of use of the joint and an upper coating layer of a material such as Sn having a melting point lower than the temperature of use of the joint.

LIST OF DOCUMENTS

Patent Document 1: JP H08-105582 A1
Patent Document 2: JP S60-026695 A1
Patent Document 3: JP H05-149486 A1

DISCLOSURE OF INVENTION

The threaded joint described in Patent Document 1 has the defects that the solid lubricating coating wears off at a relatively early stage due to its poor adhesion to the underlying layer, and that it is difficult to retain the lubricating powder released from the coating when it is worn on the wear surface in order to contribute to lubrication. Accordingly, particularly in the case of OCTG made of a high alloy steel with which galling occurs easily, its galling resistance is not sufficient to prevent galling when tightening and loosening of the joint are repeated.

Patent Document 2 and Patent Document 3 both relate to multi-layer coating with a soft metal and a hard metal on a threaded joint. However, the threaded joint described in Patent Document 2 is premised on the application of a compound grease in order to ensure that the joint exhibits sufficient galling resistance and airtightness. Accordingly, the adverse effect on the global environment and the human body caused by the use of a compound grease cannot be avoided. The threaded joint described in Patent Document 3 can exhibit airtightness by melting of the upper coating layer at the temperature of use, but its effect on galling resistance and rust prevention diminishes as tightening and loosening of the joint are repeated due to depletion of the upper layer.

It is an object of the present invention to provide a threaded joint which is free of the above-described problems of the prior art. A more particular object of the invention is to provide a threaded joint for steel pipes having excellent galling resistance, rust preventing properties, and airtightness whereby it can suppress the formation of rust and maintain excellent galling resistance and airtightness without using a compound grease even when the OCTG to be connected by the joint are made of a high alloy steel and tightening and loosening of the joint are repeated.

In order to impart the above-described level of galling resistance required by API to a threaded joint for OCTG particularly made of a high alloy steel, which readily undergoes galling, without using a compound grease, it is extremely advantageous to use a solid lubricating coating as an uppermost surface treatment layer as suggested in Patent Document 1 cited above. However, as stated above with respect to that document, if the adhesion of the solid lubricating coating to an underlying material is inadequate, the effect on improving galling resistance by the solid lubricating coating is greatly limited. In Patent Documents 2 and 3 which are not premised on the formation of a solid lubricating coating, there is no disclosure whatsoever concerning a structure which can realize high galling resistance premised on the use of a solid lubricating coating.

As a result of diligent investigations concerning what type of surface treatment is suitable for exhibiting a high galling resistance in a sustained manner when the uppermost surface treatment layer is a solid lubricating coating, it was found that a combination of two undercoat layers, namely, a first layer of a relatively hard metal or alloy formed on the steel base metal surface and a second layer of a relatively soft metal or alloy formed on the first layer and beneath the solid lubricating coating is effective at increasing the adhesion of the surface treatment layers to the base metal surface. In addition, since a lubricant constituent in the solid lubricating coating is released from the coating, forced into the underlying soft second layer, and embedded therein by the pressure applied during tightening, a lubricating effect is maintained even after the solid lubricating coating has worn away, thereby making it possible to achieve a sustained galling resistance. It was also found that there is a preferred range for the hardness of the first layer and the second layer, the surface roughness of the second layer, and the thickness of each layer.

The present invention is a threaded joint for steel pipes constituted by a pin and a box each having a threaded portion and an unthreaded metal-to-metal contact portion serving as contact surfaces of the joint when tightened, characterized in that the contact surfaces of at least one of the pin and the box are coated with a multi-layer structure comprising, from the bottom, a first layer formed from a first metal or alloy, a second layer formed from a second metal or alloy which is softer than the first metal or alloy, and a solid lubricating coating as an uppermost layer.

Preferably, the threaded joint for a steel plate pipe has at least one of the following features:

the first layer has a hardness in the range of Hv 100-500, and the second layer has a hardness in the range of Hv 10-150;

the second layer has a surface roughness of 1-6 micrometers Ra;

the coating thicknesses of the layers are 2-15 micrometers for the first layer, 5-30 micrometers for the second layer, and 5-40 micrometers for the solid lubricating coating;

the solid lubricating coating does not substantially contain harmful heavy metals;

the steel pipes are oil country tubular goods (OCTG); and the steel pipes contains at least 3 wt % of Cr.

According to the present invention, the contact surfaces of at least one of a pin and a box of a threaded joint, which include a threaded portion and an unthreaded metal-to-metal contact portion, are undercoated with two metallic layers having different hardnesses, namely, a first layer of a harder metal or alloy and a second layer of a softer metal or alloy, and then a solid lubricating coating is formed atop these metallic undercoat layers. The solid lubricating coating wears at the time of tightening and loosening of the threaded joint. However, wear of the solid lubricating coating causes the lubricant constituent or constituents contained in the coating in powder form to be releases from the coating, and the released powder is embedded in the relatively soft second layer, thereby making it possible to exhibit long-lasting galling resistance. In addition, when subjected to friction during tightening and loosening of the joint, the first and second undercoat layers do not melt since the frictional force applied to these layers and hence the frictional heat generated is decreased by the overlaid solid lubricating coating, and they together exert a rust preventing effect on the contact surfaces of the threaded joint. Therefore, a threaded joint for steel pipes according to the present invention can suppress the formation of rust, and it continues to exhibit lubricating performance in the absence of compound grease even when tightening and loosening are repeated and to maintain airtightness after tightening.

Accordingly, a threaded joint for steel pipes according to the present invention can maintain excellent galling resistance such that repeated tightening and loosening thereof can be performed without occurrence of galling, and it can prevent galling even when it is a threaded joint for OCTG made of a high alloy steel which is often exposed to a high temperature in a deep oil well or the like or used in a very corrosive environment having a high concentration of hydrogen sulfide.

BEST MODE FOR CARRYING OUT THE INVENTION

Below, an embodiment of a threaded joint for steel pipes according to the present invention will be explained while referring to the accompanying drawings.

Figure 1:
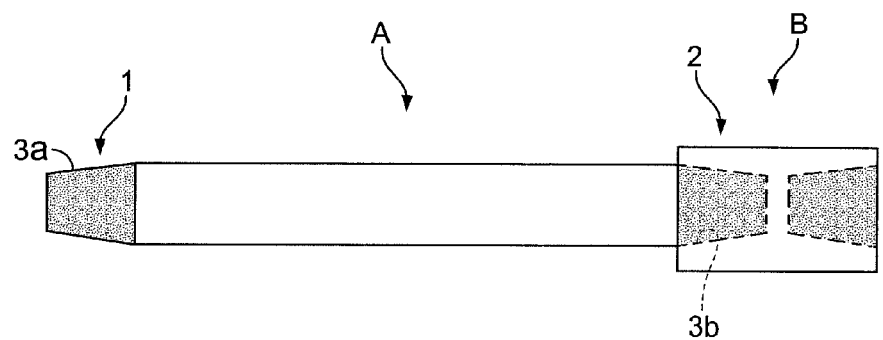
FIG. 1 shows a steel pipe and a coupling which are assembled for shipment.

FIG. 1 schematically shows the assembled structure of a typical threaded joint showing the state of a steel pipe A for an oil country tubular good and a coupling (threaded connecting member) B at the time of shipment. A pin 1 having a male threaded portion 3a on its outer surface is formed on both ends of the steel pipe A, and a box 2 having a female threaded portion 3b on its inner surface is formed on both sides of the coupling B. The pin means the element of a threaded joint having a male thread, and the box means the element of a threaded joint having a female thread. In this figure, the coupling B is already connected to one end of the steel pipe A. Although not shown in the figure, a protector is usually attached to each of the unconnected pin of the steel pipe A and the unconnected box of the coupling B prior to shipment in order to protect the threaded portions of the unconnected pin and box. The protector is removed prior to use of the threaded joint.

Typically, as shown in the figure, a pin is formed on the outer surface of both ends of a steel pipe and a box is formed on the inner surface of a coupling, which is a separate member. However, in principle, it is also possible for the inner surface of both ends of the steel pipe to be made a box and for the outer surface of the coupling to be made a pin. There are also integral threaded joints which do not use a coupling and in which one end of a steel pipe is made a pin and the other end thereof is made a box.

Figure 2:
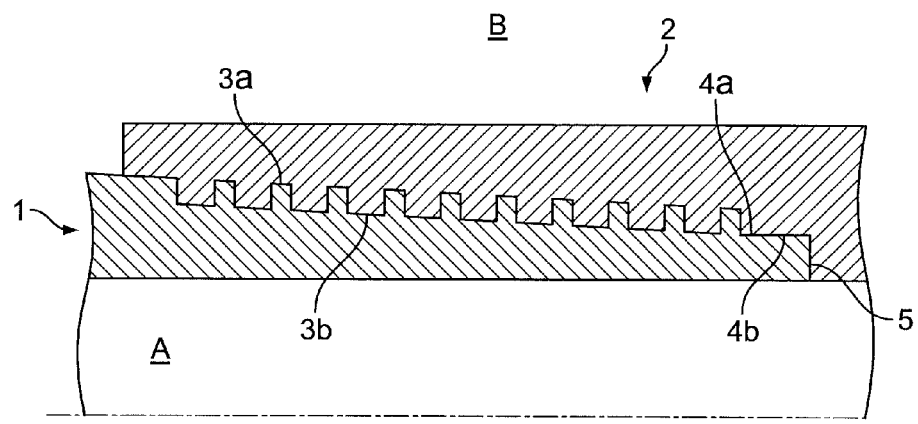
FIG. 2 shows the connecting portions of a threaded joint.

FIG. 2 schematically shows the structure of a typical threaded joint for steel pipes (also referred to below simply as a "threaded joint"). The threaded joint is constituted by a pin 1 which is formed on the outer surface of the end portion of a steel pipe A and a box 2 which is formed on the inner surface of a coupling B. The pin 1 has a male threaded portion 3a, an unthreaded metal-to-metal contact portion 4a situated between the threaded portion 3a and the tip of the steel pipe, and a shoulder portion 5 which is an end surface of the steel pipe. Correspondingly, the box 2 has a female threaded portion 3b, an unthreaded metal-to-metal contact portion 4b situated on the inner side of the threaded portion 3b, and an innermost shoulder portion.

The surfaces of the threaded portions 3a and 3b and the unthreaded metal-to-metal contact portions 4a and 4b of the pin 1 and the box 2 form the contact surfaces of the threaded joint. These contact surfaces must exhibit galling resistance and airtightness when the joint is tightened and corrosion resistance. Therefore, a compound grease containing heavy metal powders has conventionally been applied to the contact surfaces. However, as stated previously, the application of a compound grease has adverse effect on the human body and the environment.

Figure 3:
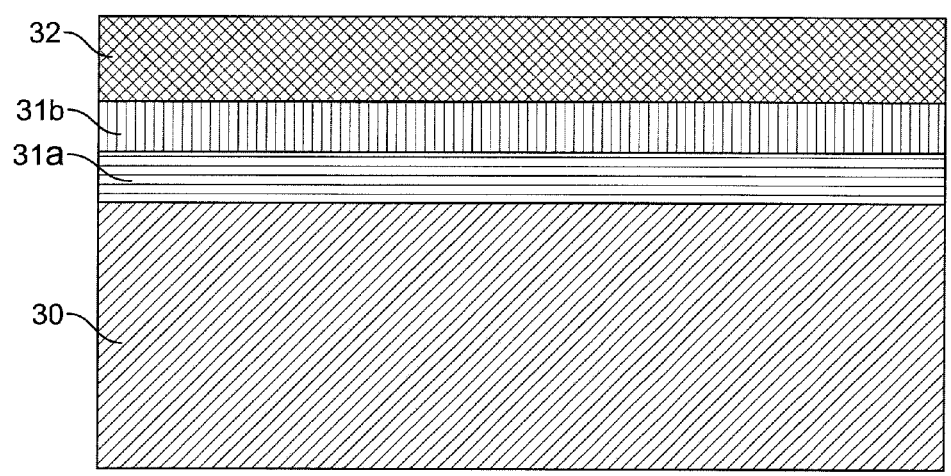
FIG. 3 is an explanatory view showing coatings formed on the contact surfaces of a threaded joint according to the present invention.

According to the present invention, as shown in FIG. 3 which schematically shows the cross-sectional structure of the coatings formed on the unthreaded metal-to-metal contact portion of a joint, the contact surfaces of at least one of the pin and the box are coated with a first layer 31a of a first metal or alloy formed on the surface of steel 30, a second layer 31b formed atop the first layer and made of a second metal or alloy which is softer than the first metal or alloy, and a solid lubricating coating 32 as an uppermost layer. Below, the first metal or alloy will be referred to simply as a harder metal, and the second metal or alloy will be referred to simply as a softer metal.

When a threaded joint according to the present invention is tightened, the solid lubricating coating forming an uppermost layer can exhibit its inherent lubricating properties over a long period due to the underlying two metallic layers having different hardnesses, whereby the threaded joint can be prevented from galling even when it is repeatedly subjected to tightening and loosening and it can maintain airtightness when tightened without using a compound grease.

The substrate (base metal) for the first layer 31a (the contact surfaces of a pin and/or box to be coated with the layer) may be made a rough surface. This surface roughening may be achieved by subjecting the surface of the steel 30 to surface roughening treatment such as blasting (including shot blasting and sand blasting) or pickling.

After the first layer 31a made of a harder metal and the second layer 31b made of a softer metal are formed by a suitable method such as electroplating, a suitable surface roughness may sometimes be imparted to the resulting surface of the second layer 31b by shot blasting or sandblasting prior to forming the solid lubricating coating 32 thereon. As a result, the adhesion of the solid lubricating coating 32 is increased.

The surface treatment to form the above-described three layers according to the present invention may be applied to the contact surfaces of both the pin and the box, but for a pin and a box which are connected to each other at the time of shipment as shown in FIG. 1, it is possible to apply the surface treatment to the contact surfaces of only one of the pin and the box. When only one of the pin and the box is treated, surface treatment in order to form the three layers is easier to carry out on a short joint member, so it is convenient to apply the surface treatment to the contact surfaces of a coupling (normally the contact surfaces of the box).

The first and second undercoat layers and the uppermost solid lubricating coating preferably cover the entirety of the contact surfaces of the pin and/or the box, but the present invention encompasses the case in which only a portion of the contact surfaces (such as only the surface of the unthreaded metal-to-metal contact portion) is coated with the three layers.

[Base Metal]

As stated above, a threaded joint for steel pipes according to the present invention has extremely good galling resistance, so it can prevent galling at the time of repeated tightening and loosening even of a threaded joint made of a high alloy steel which readily undergoes galling.

Accordingly, OCTG are preferred as steel pipes which are connected by a threaded joint according to the present invention. In addition, the type of steel constituting the threaded joint (namely, a steel pipe such as an oil country tubular good and a coupling in cases other than an integral joint) is preferably a high alloy steel containing at least 3% Cr from the standpoint of corrosion resistance. Examples of such a steel are ones having a Cr content of 5%, 13%, or 25%. In this specification, all percents are by mass unless otherwise indicated.

[Undercoat Layers]

A threaded joint according to the present invention has an undercoat with a two-layer structure consisting of a first or lower layer of a harder metal and a second or upper layer of a softer metal formed on the contact surfaces of a pin and/or a box.

The metal or alloy used to form the first layer preferably has an Hv hardness of 100-500. If it has an Hv hardness of less than 100, its adhesion to the base metal may sometimes be inadequate. On the other hand, if it has an Hv hardness exceeding 500, the resulting coating of the first layer becomes brittle, and it may have a decreased adhesion to the base metal. In addition, cracks tend to easily develop in the coating, leading to a decrease in corrosion resistance. The hardness of an electroplated metal coating can be controlled by changing the current density for electroplating, for example.

Examples of metals or alloys suitable for the first layer include Cu, Ni, Cr, Cu—Au, Cu—Ag, and Cu—Ni. The first layer can be formed by a suitable method such as electroplating. The coating thickness of the first layer is preferably in the range of 2-15 micrometers. If it is less than 2 micrometers, the coating strength decreases to the extent that the first layer may peel easily. If it exceeds 15 micrometers, the first layer may not be able to withstand the shearing force at the time of tightening and may easily peel from the base metal.

A metal or alloy used to form the second layer preferably has an Hv hardness of 10-150 provided that its hardness is lower than that of the first layer. If it has an Hv hardness of less than 10, the second layer will not have a strength sufficient to support the solid lubricating coating, and even if the lubricating powder released from the solid lubricating coating is embedded in the second layer, the second layer itself may wear away rapidly, thereby making it impossible for the joint to maintain the desired lubricating properties. If the second layer has an Hv hardness exceeding 150, it is too hard to allow the lubricating powder released from the solid lubricating coating to be embedded therein in a sufficient amount, and it becomes difficult for the threaded joint to have long-lasting lubricating properties.

Examples of metals or alloys suitable for the second layer include Sn, Zn, Ag, Sn—Bi, Sn—Zn, Sn—Ag, and Cu—Sn—Bi. The metal or alloy used for the second layer should not be melted during tightening, or its melting point should be higher than the temperature of the joint during tightening. Like the first layer, the second layer can be formed by a suitable method such as electroplating. The coating thickness of the second layer is preferably in the range of 5-30 micrometers. If it is less than 5 micrometers, the amount of lubricating powder which can be embedded in the second layer may be so small that the galling resistance of the joint becomes inadequate. If it exceeds 30 micrometers, the second layer sometimes cannot support the overlaid solid lubricating coating when a high pressure is applied.

In order to ensure that a solid lubricating coating formed atop the second layer has sufficient adhesion to the second layer, the surface roughness of the second layer is preferably increased to 1-6 micrometers Ra by a known surface roughening treatment such as shot blasting or sandblasting, if necessary. If the second layer has a surface roughness Ra of less than 1 micrometer, the adhesion of the solid lubricating coating to the second layer may become inadequate. If it has an Ra exceeding 6 micrometers, it may become difficult for the softer second layer to have a sufficient coating thickness over its entire surface, thereby decreasing its effect of enabling lubricating powder released from the solid lubricating coating to be embedded therein.

The first layer and the second layer which are both of metallic nature can be formed by a known plating method such as electroplating, electroless plating, vapor phase plating, or the like. From the viewpoint of economy, electroplating is particularly preferred.

Prior to forming the first metal or alloy layer according to the present invention, as is known in the prior art, a thin Ni layer may initially be formed on the surface of the base metal by strike plating in order to improve the adhesion of the first layer, and such a variation is of course encompassed by the present invention.

Ni strike plating can be performed, for example, using a bath formed by dissolving nickel chloride in deionized water to give a Ni ion concentration of 55-80 g/L followed by addition of 30-50 μL of copper sulfate. A commercially available brightener may be added to the bath. A coating thickness of Ni suitable for strike plating can be obtained by plating using this bath at a temperature of 20-40° C. with a current density of 2-6 A/dm$^2$.

When forming the first layer and the second layer by electroplating, the plating conditions may be the same as employed conventionally, and there is no particular restriction thereon. The plating conditions for some metals or alloys which can be used to form the second layer will be briefly explained below.

A Sn plating layer can be formed by electroplating using a plating bath containing, for example, 200 g/L of tin fluoroborate, 125 g/L of fluoroboric acid, 25 g/L of boric acid, 2 g/L of gelatin, and 1 g/L of beta-naphthol at a temperature of 20-25° C. with a current density of 1-5 A/dm$^2$. For Sn plating, it is most common to use such a fluoroborate plating bath, but from the standpoint of ease of sewage treatment, it is also possible to use a commercially available, organic sulfonate-based Sn plating bath.

A Sn—Bi alloy plating layer can be formed in accordance with the alkaline tin plating method or the acidic tin plating method, for example. By adding Bi ions to the Sn ions in a plating bath used in such a plating method, the resulting Sn—Bi alloy plated layer has a hardness which is greatly increased compared to a pure Sn layer. For example, the hardness of a Sn—Bi alloy plated layer containing 0.5-10% of Bi coprecipitated with Sn is two or three times as high as that of a pure Sn layer (Hv of 8-10).

The plating conditions for the alkaline plating method include, for example, potassium stannate: 100-110 g/L, potassium hydroxide: 35-60 g/L, Bi: 0.5-1.5 g/L as metal, bath temperature: 75-85° C., and current density: 0.5-3 A/dm$^2$.

The plating conditions for the acid plating method include, for example, organic acid: 130 g/L, Sn: 10 g/L as metal, Bi: 3 g/L as metal, bath temperature: 30-40° C., and current density: 0.3-3.5 A/dm$^2$.

The plating conditions for Cu—Sn—Bi alloy plating include, for example, organic acid: 130-180 g/L, Cu: 1 g/L as metal, Sn: 15 g/L as metal, Bi: 1.5 g/L as metal, bath temperature: 15-30° C., and current density: 0.5-3.5 A/dm$^2$.

[Solid Lubricating Coating]

In the present invention, a solid lubricating coating which exhibits a lubricating effect is formed as an uppermost layer atop the above-described two undercoat metallic layers.

Any solid lubricating coating having sufficient lubricity can be used in the present invention as long as it does not have an adverse effect on the environment or the human body. Typically such a coating has a composition based on a powder having a lubricating activity (referred to below as a "lubricating powder") and a binder and may further contain one or more additives such as a lubricating additive, a corrosion inhibitor, and a pigment.

Useful lubricating powders include substances which are recognized in the OSPAR Convention as imposing little or no burden on the ocean environment such as graphite, mica, talc, calcium carbonate, and clay minerals (such as kaolin and bentonite), as well as substances which are known to be nontoxic such as molybdenum disulfide, tungsten disulfide, tin disulfide, PTFE, MCA (melamine cyanurate), gilsonite (natural asphalt), fluorinated graphite, boron nitride (BN), and $Bi_2S_3$. A commercially available product can be used for any of these materials. For graphite, it is particularly preferred to use graphite having a crystallinity of at least 88% and more preferably at least 90% and at most 99% from the standpoint of galling resistance.

The binder may be either organic or inorganic. Namely, it may be an organic resin or an inorganic polymeric compound.

Organic resins suitable as a binder are those having good heat resistance, moderate to fairly good hardness, and good wear resistance. Examples of such resins include thermosetting resins such as epoxy resins, polyimides, polyamide-imides, polycarbodiimide resins, polyethersulfones, polyether ether ketones, phenolic resins, and furan resins, as well as polyethylene resins and silicone resins.

Typically, these organic resins are formulated into a coating composition by dissolving a resin in a solvent to form a resin solution. Various low boiling organic solvents including hydrocarbons (such as toluene) and alcohols (such as isopropyl alcohol) can be used alone or in combination. A lubricating powder and optional additives are added to a solution of an organic resin binder to form a coating composition, and the coating composition is applied to the contact surfaces of at least one of a pin and a box which have been undercoated with the first and second layers, thereby forming a solid lubricating coating as an uppermost layer. In order to increase the adhesion and wear resistance of the solid lubricating coating, it is preferable to subject the coating to post heat treatment for curing. Such post heat treatment is preferably carried out at a temperature of at least 120° C. and more preferably at 150-380° C. for at least 30 minutes and more preferably for 30-60 minutes.

It is also possible to use a hot melt type binder having a softening temperature in the range of 100-220° C., which forms a low viscosity fluid at a high temperature and can be applied without using a solvent. Examples of such a binder include various thermoplastic resins, ethylene vinyl acetate copolymers, polyamides, polyolefin copolymers, and polyurethanes. When using this type of binder to form a solid lubricating coating, both the base metal having the at least two undercoat layers and the coating composition which is applied and contains lubricating powder are previously heated to at least the softening point of the binder, and the coating composition in which the binder is melted is applied using a spray gun, for example.

A photo-setting resin can also be used as a binder for a solid lubricating coating. It is usually formulated into a coating composition without using a solvent.

The inorganic polymeric compound used as a binder for a solid lubricating coating is a compound having a structure formed by three-dimensionally crosslinked metal-oxygen bonds such as Ti—O, Si—O, Zr—O, Mn—O, Ce—O, or Ba—O. This compound can be formed by hydrolysis and subsequent condensation of a hydrolyzable organometallic compound, which is typically a metal alkoxide or a hydrolyzable inorganic compound such as titanium tetrachloride.

Useful metal alkoxides are those having lower alkoxy groups such as methoxy, ethoxy, isopropoxy, propoxy, isobutoxy, butoxy, or tert-butoxy. Preferred metal alkoxides are titanium or silicon alkoxides, and titanium alkoxides are particularly preferred. Among these, titanium isopropoxide is most preferred due to its excellent film-forming properties.

The hydrolyzable organometallic compound used as a raw material for an inorganic polymeric compound may contain a non-hydrolyzable alkyl group which may contain a functional group such as an amine or epoxy group. For example, an organometallic compound such as a compound known as a silane coupling agent in which one or two of the four alkoxy groups attached to a silicon atom are replaced by an alkyl group or groups which may contain a functional group can be used as all or a portion of the raw material for the inorganic polymeric compound.

When the binder is an inorganic polymeric compound such as one derived from a metal alkoxide, a coating composition can be formed by adding a lubricating powder to a solution of the metal alkoxide in a solvent and dispersing it therein, and it is applied to the contact surfaces of at least one of a pin and a box which have been undercoated with the first and the second layers. As the hydrolysis of the metal alkoxide and condensation of the hydrolyzate proceeds during subsequent humidifying treatment optionally followed by heating, a solid lubricating coating having a lubricating powder dispersed in a binder of an inorganic polymeric compound having a structure made of metal-oxygen bonds is formed.

As a solvent for a metal alkoxide, various organic solvents including polar solvents such as alcohols (e.g., ethyl alcohol, isopropyl alcohol, butyl alcohol) and ketones, as well as hydrocarbons, halogenated hydrocarbons, and the like can be used. In order to promote film formation, the metal alkoxide in the solution may be partially hydrolyzed prior to application. In order to accelerate hydrolysis of the alkoxide after application, a small amount of water and/or an acid which serves as a hydrolysis catalyst may be added to the solution of the metal alkoxide.

Humidifying treatment for promoting hydrolysis of the metal alkoxide in the applied coating composition can be carried out by merely leaving the applied surface in air for a certain length of time, but it is preferably carried out in humid air with a relative humidity of at least 70%. Preferably, heating for curing is carried out after humidifying treatment. As a result of heating, hydrolysis of the metal alkoxide and condensation of the resulting hydrolyzates as well as discharge of the alcohol produced as a by-product of the hydrolysis reaction are all promoted, leading to completion of film formation in a short period, and the resulting solid lubricating coating has an increased adhesion, which results in an increase in galling resistance. This heating is preferably carried out after evaporation of the solvent in the coating composition. Preferably the heating temperature is in the range of 100-200° C. and is close to the boiling point of the alcohol which is formed as a by-product. It is still more effective to blow hot air during heating.

The mass ratio (B/A) of the content (B) of the lubricating powder to the content (A) of the binder in the solid lubricating coating is preferably 0.3-9.0. If this mass ratio is less than 0.3, the effect of the lubricating powder on improving the lubricating properties of the solid lubricating coating is not significant, and the joint is not sufficiently improved in galling resistance. If this mass ratio becomes larger than 9.0, the adhesion of the solid lubricating coating decreases significantly, resulting in the occurrence of problems such as separation of the lubricating powder from the solid lubricating coating. When further improvement in galling resistance is desired, such as when the amount of thread interference is large, the above mass ratio is more preferably in the range of 0.5-7.0. When a still further improvement in galling resistance is desired such as in the case of a joint made of a high alloy steel, the above mass ratio is still more preferably in the range of 0.5-5.0.

The thickness of the solid lubricating coating is preferably at least 5 micrometers. At the time of tightening a threaded joint, the lubricating powder bound by the binder in the solid lubricating coating is released by the action of the high pressure applied by tightening and spreads over the entire contact surfaces, and some of the released powder is embedded in the underlying second layer made of a softer metal, thereby making it possible to exhibit enduring galling resistance. If the thickness of the solid lubricating coating is less than 5 micrometers, the absolute amount of the lubricating powder contained in the coating becomes so small that the coating may not provide sufficiently improved lubricating properties.

Some concerns arise, if the thickness of the solid lubricating coating is larger than 40 micrometers. For example, the amount of tightening may become inadequate due to interference between threads, thereby causing a decrease in airtightness, or if the pressure is increased in order to guarantee airtightness, galling may occur easily. In addition, the tendency of the solid lubricating coating to peel increases. However, with some thread geometries, such a thick solid lubricating coating can be used. The thickness of the solid lubricating coating is preferably at least 10 micrometers and at most 40 micrometers from the standpoints of decreasing the amount of discharge to the environment as much as possible as well as economy, galling resistance, and rust prevention.

Application of a coating composition to form a solid lubricating coating can be carried out by suitable known methods such as brush coating, immersion, and air spraying.

Various additives including a rust preventing agent can be added to the solid lubricating coating as long as they do not have a significant adverse effect on galling resistance. For example, addition of one or more of zinc powder, a chromium pigment, and an alumina pigment can increase the rust preventing properties of the solid lubricating coating itself. Additional additives which can be added to the solid lubricating coating include a lubricating additive, an antioxidant, and a coloring agent (pigment). Examples of a lubricating additive are wax and metal soap such as an alkaline earth metal salt of a fatty acid.

The wax may be any of animal waxes, vegetable waxes, mineral waxes, and synthetic waxes. Waxes which can be used include animal waxes such as beeswax and whale tallow; vegetable waxes such as Japan wax, carnauba wax, candelilla wax, and rice wax; mineral waxes such as paraffin wax, microcrystalline wax, petrolatum, montan wax, ozokerite, and ceresin; and synthetic waxes such as oxide wax, polyethylene wax, Fischer-Tropsch wax, amide wax, and hardened castor oil (castor wax). Of these, paraffin wax with a molecular weight of 150-500 is particularly preferred.

The alkaline earth metal salt of a fatty acid is preferably an alkaline earth metal salt of a fatty acid having 12-30 carbon in terms of the lubricating and rust preventing properties. The fatty acid can be either saturated or unsaturated, and it includes mixed fatty acids derived from a natural fatty oil or fat such as beef tallow, lard, wool fat, palm oil, rapeseed oil, and coconut oil, as well as single compounds such as lauric acid, tridecanoic acid, myristic acid, palmitic acid, lanopalmitic acid, stearic acid, isostearic acid, oleic acid, elaidic acid, arachic acid, behenic acid, erucic acid, lignoceric acid, and lanoceric acid. The fatty acid salt is preferably in the form of a calcium salt, and it may be either a neutral salt or a basic salt. It is preferably in the form of calcium stearate.

When the contact surfaces of just one (e.g., the box) of a pin and a box of a threaded joint for steel pipes are coated with the multi-layered coating according to the present invention which comprises a first undercoat layer of a harder metal, a second undercoat layer of a softer metal, and an uppermost solid lubricating coating, the contact surfaces of the other member (e.g., pin) may remain untreated, but from the standpoint of corrosion prevention, it is preferably coated with either the above-described two undercoat layers or the solid lubricating coating.

Alternatively, the contact surfaces of the other member may be coated with a rust (corrosion) preventing layer or coating, thereby protecting the surface from air, and even if the surface contacts water which is condensed from the surrounding air during storage of the threaded joint, it is prevented from developing rust. Such a rust preventing coating is broken under the impact of initial tightening of the joint and is united with the solid lubricating coating applied to the other member of the joint to exhibit lubricating properties, so it does not impair lubricating properties.

The following examples are presented to further illustrate the present invention. These examples are to be considered in all respects as illustrative and not restrictive.

EXAMPLES

In the examples, the contact surfaces of a pin which includes the surface of its threaded portion and unthreaded metal-to-metal contact portion will be referred to as the "pin surface", and the contact surfaces of a box which includes the surface of its threaded portion and unthreaded metal-to-metal contact portion will be referred to as the "box surface". The surface roughness is the measured value of Ra unless otherwise indicated.

The pin surface and the box surface of a threaded joint [outer diameter of 17.78 cm (=7 inches) and wall thickness of 1.036 cm (0.408 inches)] made from either 13% Cr steel A or high alloy steel B having the compositions shown in Table 1 were subjected to the surface treatment shown in Table 2 and described below for each example. The undercoat layers were formed by electroplating, and the solid lubricating coating was formed by air spraying. In some examples, the surface of the second (upper) undercoat layer was roughened by subjecting it to shot blasting lightly. The proportions of the components in each layer are expressed as a mass ratio in the description of each example.

Galling resistance of a threaded joint was evaluated by the number of tightening cycles before galling occurred in a repeated tightening and loosening test in which tightening was carried out with a tightening speed of 10 rpm and a tightening torque of 14 kN-m. After loosening of the joint, the state of galling of the contact surfaces of the pin and the box was investigated visually. When the occurrence of only slight galling caused by tightening was observed and it was possible to again tighten the joint after repair, the joint was repaired, and tightening and loosening were continued. The results of the repeated tightening and loosening test are shown in Table 3.

TABLE 1

| Chemical composition of threaded joint | | | | | | | | |
|---|---|---|---|---|---|---|---|---|
| Symbol | C | Si | Mn | P | S | Cu | Ni | Cr | Mo |
| A | 0.19 | 0.25 | 0.8 | 0.02 | 0.01 | 0.04 | 0.1 | 13 | 0.04 |
| B | 0.02 | 0.3 | 0.5 | 0.02 | 0.01 | 0.5 | 7 | 25 | 3.2 |

(mass %; remainder is Fe and unavoidable impurities)

TABLE 2

| No. | Pin Surface | Pin Rust preventing coating | Box 1st undercoat layer | Box 2nd undercoat layer | Box Solid lubricating coating | Steel |
|---|---|---|---|---|---|---|
| Example 1 | as machined (3 μm Rmax) | none | Cu plating Hv 200 thickness: 4 μm | Sn plating Hv 10 thickness: 5 μm surface roughness: 1 μm Ra | lubricating powder: tungsten disulfide binder: epoxy resin thickness: 20 μm | A |
| Example 2 | as machined (3 μm Rmax) | acrylic resin 10 μm thick | Cu plating Hv 150 thickness: 5 μm | Sn—Bi alloy plating Hv 30 thickness: 12 μm surface roughness: 2 μm Ra | lubricating powder: graphite binder: hot melt resin (polyamide, containing carnauba wax) thickness: 25 μm | A |
| Example 3 | as machined (3 μm Rmax) | none | Ni plating Hv 250 thickness: 5 μm | Sn—Zn alloy plating Hv 50 thickness: 10 μm surface roughness: 1.5 μm Ra | lubricating powder: mica, talc, and bentonite binder: polyamide-imide resin thickness: 15 μm | B |
| Example 4 | as machined (3 μm Rmax) | acrylic resin 15 μm thick | Cu plating Hv 250 thickness: 8 μm | Cu—Sn—Bi alloy plating Hv 100 thickness: 20 μm surface roughness: 5 μm Ra | lubricating powder: graphite and molybdenum disulfide binder: TiO-type inorganic polymer thickness: 10 μm | B |
| Compar. Example 1 | as machined (3 μm Rmax) | none | Cu plating Hv 150 thickness: 6 μm surface roughness: 0.5 μm Ra | none | lubricating powder: tungsten disulfide binder: epoxy resin thickness: 20 μm | A |
| Compar. Example 2 | as machined (3 μm Rmax) | none | Sn plating Hv 10 thickness: 5 μm | Cu plating Hv 150 thickness: 10 μm surface roughness: 1.2 μm Ra | lubricating powder: tungsten disulfide binder: epoxy resin thickness: 20 μm | A |

TABLE 3

| No. | | 1 | 2 | 3 | 4 | 5 | 6 | 7 | 8 | 9 | 10 |
|---|---|---|---|---|---|---|---|---|---|---|---|
| Example | 1 | ○ | ○ | ○ | ○ | ○ | ○ | ○ | ○ | ○ | ○ |
|  | 2 | ○ | ○ | ○ | ○ | ○ | ○ | ○ | ○ | ○ | ○ |
|  | 3 | ○ | ○ | ○ | ○ | ○ | ○ | ○ | Δ | Δ | Δ |
|  | 4 | ○ | ○ | ○ | ○ | ○ | ○ | ○ | ○ | Δ | Δ |
| Compar. Example | 1 | ○ | ○ | X | — | — | — | — | — | — | — |
|  | 2 | ○ | X | — | — | — | — | — | — | — | — |

Occurrence of galling[1] (number = tightening cycle)

[1]○: no occurrence of galling
Δ: slight occurrence of galling (retightening possible after repair of galling scratches)
X: heavy occurrence of galling (repair not possible)
—: test terminated Example 1

The box and pin surfaces of a threaded joint of the 13 Cr steel having composition A shown in Table 1 were subjected to the following surface treatment.

The box surface was finished by machining (to a surface roughness of 3 is micrometers Rmax) and then coated with a first Cu plating layer with a hardness of Hv 200 to a thickness of 4 micrometers by electroplating and then with a second Sn plating layer with a hardness of Hv 10 to a thickness of 5 micrometers also by electroplating. After the surface of the second plating layer was lightly roughened by shot blasting to a surface roughness of 1 micrometer Ra, a solid lubricating coating containing tungsten disulfide as a lubricating powder dispersed in an epoxy resin binder (mass ratio of lubricating powder/binder=4.0) was formed thereon to a thickness of 20 micrometers.

The pin surface was finished by machining (surface roughness of 3 micrometers Rmax) and remained in this state.

In the repeated tightening and loosening test, as shown in Table 3, in 10 cycles of tightening and loosening, there was no occurrence of galling indicating extremely good results.

Example 2

The box and pin surfaces of a threaded joint of the 13 Cr steel having composition A shown in Table 1 were subjected to the following surface treatment.

The box surface was finished by machining (to a surface roughness of 3 micrometers Rmax) and coated initially with Ni strike plating to a thickness of 1 micrometer by electroplating, next with a first Cu plating layer with a hardness of Hv 150 to a thickness of 5 micrometers by electroplating, and then with a second Sn—Bi alloy plating layer with a hardness of Hv 30 to a thickness of 12 micrometers also by electroplating. After the surface of the second plating layer was lightly roughened by shot blasting to a surface roughness of 2 micrometers Ra, a solid lubricating coating containing amorphous graphite having a crystallinity of 96.4% as a lubricating powder dispersed in a hot melt-type binder (a polyamide resin containing carnauba wax) (mass ratio of lubricating powder to binder=2.0) was formed thereon to a thickness of 25 micrometers by application of a coating composition therefor using an air spraying gun after both the box surface to be coated and the coating composition had been heated to 150° C.

The pin surface was finished by machining (to a surface roughness of 3 micrometers Rmax) and then coated with an acrylic resin to a thickness of 10 micrometers as a rust preventing coating.

In the repeated tightening and loosening test, as shown in Table 3, there was no occurrence of galling in 10 cycles of tightening and loosening indicating extremely good results.

Example 3

The box and pin surfaces of a threaded joint of the high alloy steel having composition B shown in Table 1 were subjected to the following surface treatment.

The box surface was finished by machining (to a surface roughness of 3 micrometers Rmax) and then coated with a first Ni plating layer with a hardness of Hv 250 to a thickness of 5 micrometers by electroplating and a second Sn—Zn alloy plating layer with a hardness of Hv 50 to a thickness of 10 micrometers also by electroplating. After the surface of the second layer was lightly roughened by shot blasting to a surface roughness of 1.5 micrometers Ra, a solid lubricating coating containing mica, talc, and bentonite as lubricating powders dispersed in a polyamide-imide resin binder (mass ratio of lubricating powder to binder=8.0) was formed thereon to a thickness of 15 micrometers.

The pin surface remained in an as-machined state (surface roughness of 3 micrometers Rmax).

Since the steel was a high alloy steel which undergoes galling extremely easily, in the repeated tightening and loosening test, as shown in Table 3, in 10 cycles of tightening and loosening, light galling occurred at the completion of the seventh cycle, but by performing repair, tightening of the joint could be continued. This result is of a level having absolutely no problems with respect to galling resistance of this type of a threaded joint.

Example 4

The box and pin surfaces of a threaded joint of the high alloy steel having composition B shown in Table 1 were subjected to the following surface treatment.

The box surface was finished by machining (to a surface roughness of 3 micrometers Rmax) and coated initially with Ni strike plating to a thickness of 1 micrometer by electroplating. Next, it was coated with a first Cu plating layer with a hardness of Hv 250 to a thickness of 8 micrometers by electroplating and then with a second Cu—Sn—Bi alloy plating layer with a hardness of Hv 100 to a thickness of 20 micrometers also by electroplating. The surface of the second plating layer was 5 micrometers Ra. Thereafter, a solid lubricating coating containing graphite and molybdenum disulfide as lubricating powders dispersed in a binder of a Ti—O type inorganic polymeric compound (mass ratio of lubricating powder to binder=2.3) was formed atop the second layer to a thickness of 10 micrometers.

The pin surface was finished by machining (to a surface roughness of 3 micrometers Rmax) and then coated with an acrylic resin to a thickness of 15 micrometers as a rust preventing coating.

In the repeated tightening and loosening test, as shown in Table 3, in 10 cycles of tightening and loosening, slight galling occurred at the completion of the eighth cycle, but by performing repair, tightening of the joint could be continued. This result is of a level having absolutely no problems with respect to galling resistance of this type of a threaded joint.

Comparative Example 1

The box and pin surfaces of a threaded joint of the 13 Cr steel having composition A shown in Table 1 were subjected to the following surface treatment.

The box surface was finished by machining (to a surface roughness of 3 micrometers Rmax) and then coated with a Cu plating layer with a hardness of Hv 150 and a surface roughness of 0.5 micrometers Ra to a thickness of 6 micrometers by electroplating. Then, a solid lubricant coating containing tungsten disulfide as a lubricating powder dispersed in an epoxy resin binder (mass ratio of lubricating powder to binder=4.0) was formed to a thickness of 20 micrometers on the surface of the plating layer.

The pin surface remained in an as-machined state (surface roughness of 3 micrometers Rmax).

In the repeated tightening and loosening test, as shown in Table 3, in 10 cycles of tightening and loosening, there was no occurrence of galling through the second cycle. However, severe galling occurred on the third cycle, and the test had to be terminated.

Comparative Example 2

The box and pin surfaces of a threaded joint of the 13 Cr steel having composition A shown in Table 1 were subjected to the following surface treatment.

The box surface was finished by machining (to a surface roughness of 3 micrometers Rmax) and then coated with a first Sn plating layer with a hardness of Hv 10 to a thickness of 5 micrometers by electroplating and a second Cu plating layer with a hardness of Hv 150 to a thickness of 10 micrometers also by electroplating. The surface roughness of the second plating layer was 1.2 micrometers Ra. Thereafter, a solid lubricant coating containing tungsten disulfide as a lubricating powder dispersed in an epoxy resin binder (mass ratio of lubricating powder to binder=4.0) was formed to a thickness of 20 micrometers on the surface of the second plating layer.

The pin surface remained in an as-machined state (surface roughness of 3 micrometers Rmax).

In the repeated tightening and loosening test, as shown in Table 3, in 10 cycles of tightening and loosening, there was no occurrence of galling on the first cycle. However, severe galling occurred on the second cycle, and the test had to be terminated.

Concerning rust preventing properties, the same coating layers for the box surface as shown in Table 2 for each example were formed on a separately prepared coupon-shaped test piece (70 mm×150 mm×2 mm thick) of the same steel as used in the example, and the coated test piece was subjected to a humidity cabinet test (temperature of 50° C., relative humidity of 98%, duration of 200 hours). From this test, it was ascertained that there was no occurrence of rust for any of the examples.

The present invention has been explained with respect to embodiments which are considered to be preferred at present, but the present invention is not limited to these embodiments. Modifications and variations can be made within a range which does not conflict with the technical concept of the invention gathered from the claims and the specification as a whole, and a threaded joint employing such a modification or variation should be understood as falling within the technical scope of the present invention.

The invention claimed is:

1. A threaded joint for steel pipes comprising a pin and a box each having a threaded portion and an unthreaded metal-to-metal contact portion serving as contact surfaces of the joint when tightened without using a compound grease, characterized in that the contact surfaces of at least one of the pin and the box are coated with a multi-layer structure comprising:

from the bottom, a first layer formed from a first metal or alloy, a second layer, which contains tin, the second layer being formed from a second metal or alloy, which is softer than the first metal or alloy, and a solid lubricating coating as an uppermost layer, the solid lubricating coating having a composition based on a lubricating powder and a binder comprised of an organic resin or inorganic polymeric compound, wherein the first layer has a coating thickness of 2-15 micrometers, the second layer has a coating thickness of 5-30 micrometers, and the solid lubricating coating has a coating thickness of 5-40 micrometers, wherein the first layer has a hardness in the range of Hv 100-500, and the second layer has a hardness in the range of Hv 10-150, provided that the hardness of the second layer is lower than the hardness of the first layer.

2. A threaded joint for steel pipes as set forth in claim 1 wherein the second layer has a surface roughness in the range of 1-6 micrometers Ra.

3. A threaded joint for steel pipes as set forth in claim 1 wherein the solid lubricating coating does not contain lead.

4. A threaded joint for steel pipes as set forth in claim 1 wherein the steel pipes are oil country tubular goods.

5. A threaded joint for steel pipes as set forth in claim 4 wherein the steel pipes contain at least 3% of Cr.

6. A threaded joint for steel pipes comprising a pin and a box each having a threaded portion and an unthreaded metal-to-metal contact portion serving as contact surfaces of the joint when tightened without using a compound grease, characterized in that the contact surfaces of one of the pin and the box are coated with a multi-layer structure comprising:

from the bottom, a first layer formed from a first metal or alloy, a second layer, which contains tin, the second layer being formed from a second metal or alloy, which is softer than the first metal or alloy, and a solid lubricating coating as an uppermost layer, the solid lubricating coating having a composition based on a lubricating powder and a binder comprised of an organic resin or inorganic polymeric compound, and that the contact surfaces of the other of the pin and the box are coated with a rust preventing layer, wherein the first layer has a coating thickness of 2-15 micrometers, the second layer has a coating thickness of 5-30 micrometers, and the solid lubricating coating has a coating thickness of 5-40 micrometers, wherein the first layer has a hardness in the range of Hv 100-500, and the second layer has a hardness in the range of Hv 10-150, provided that the hardness of the second layer is lower than the hardness of the first layer.

7. A threaded joint for steel pipes as set forth in claim 6 wherein the second layer has a surface roughness in the range of 1-6 micrometers Ra.

8. A threaded joint for steel pipes as set forth in claim 6 wherein the solid lubricating coating does not contain lead.

9. A threaded joint for steel pipes as set forth in claim 6 wherein the steel pipes are oil country tubular goods.

\* \* \* \* \*